Patented Feb. 22, 1927.

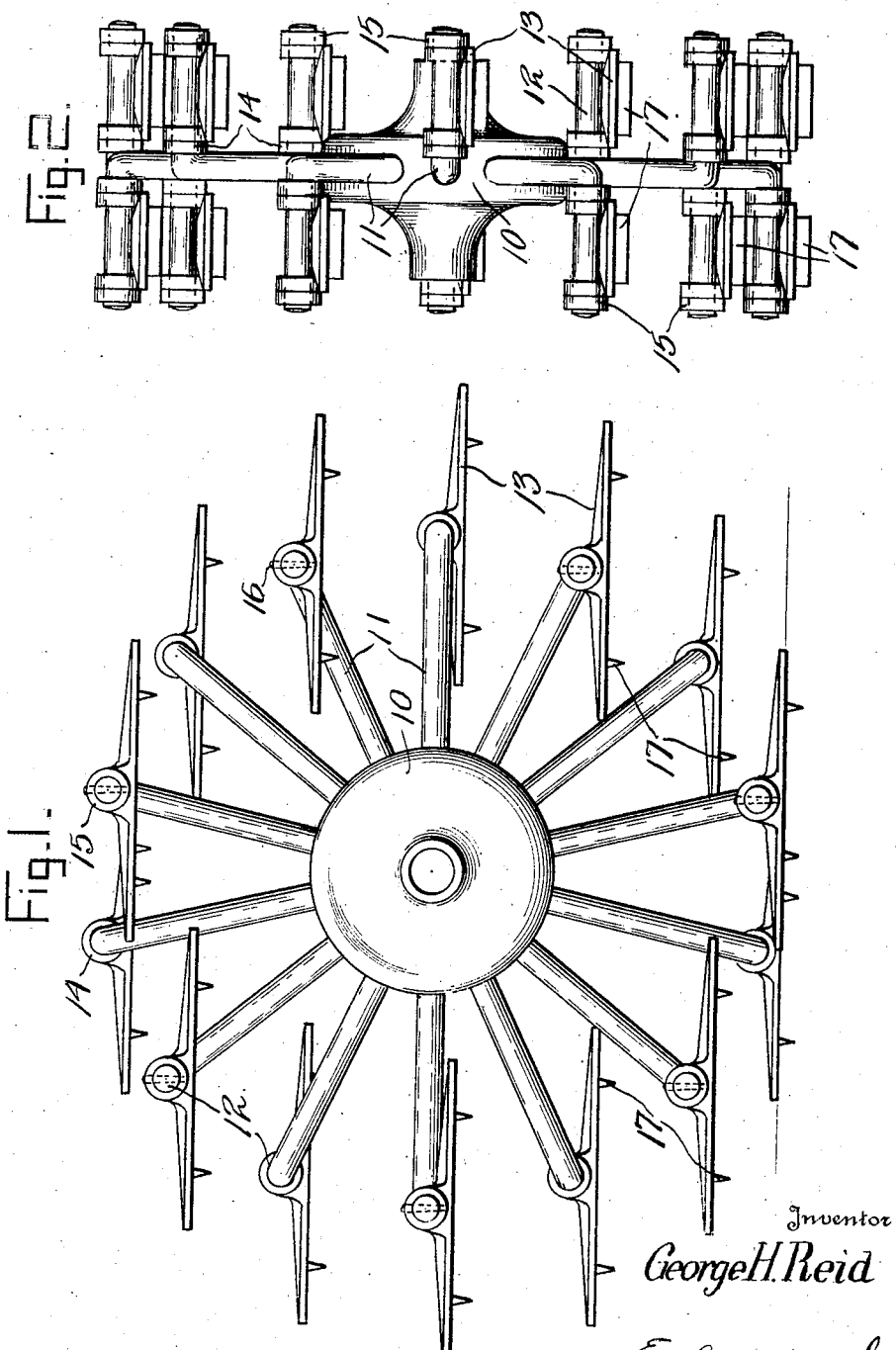

1,618,949

UNITED STATES PATENT OFFICE.

GEORGE H. REID, OF ORANGEVILLE, ONTARIO, CANADA.

TRACTION WHEEL.

Application filed November 6, 1926, Serial No. 146,805, and in Canada July, 1926.

My said invention relates to a traction wheel and it is an object of the invention to provide a traction wheel which will prevent creeping, prevent sinking in soft ground and having the greatest possible amount of traction.

Referring to the accompanying drawings which are made a part hereof and on which similar reference characters indicate similar parts, Figure 1 is a side elevation of a wheel constructed in accordance with my invention, and Figure 2, a view taken at right angles to Figure 1.

In the drawings reference character 10 indicates a hub preferably of cast iron, steel or similar material provided with a plurality of spokes 11 mounted therein. The outer end of each spoke is preferably disposed at right angles to its body and alternate spokes have their right angularly disposed ends 12 extending in opposite directions. The spokes may either be cast integrally with the hub or may be formed of a different material and mounted in the hub in any desired manner.

An iron foot or shoe 13 is pivotally mounted on the portion of the spoke 12 disposed at right angles to the body of the same and such feet or shoes constitute the circumference of the wheel. Each foot or shoe 13 comprises a substantially flat plate having an upstanding centrally disposed lug at each side thereof perforated for the reception of the right angular extremity 12 of the spoke. A spacing ring or sleeve 14 is shrunk or otherwise secured on the right angular portion of the spoke adjacent its connection with the main body of the spoke for limiting the movement of the shoe in one direction and for holding the same properly spaced from the said spoke body. A retaining washer or cap 15 is mounted on the outer end of said right angular portion of the spoke and such retaining washer is held in position by means of a key 16 or by any other desired means.

Each shoe or foot 13 is provided with a traction element or cleat 17 comprising an elongated tapered projection spaced from each end of the same and in this construction the shoe is held in a state of equilibrium so that as the wheel revolves the shoes come into contact with the earth and they engage a substantially flat area which is larger than would be engaged by a wheel having a curved circumference of substantially the same diameter. It will therefore be readily understood that a wheel of this character will afford a greater traction and therefore prevent creeping and skidding of the wheels as well as sinking in soft ground.

It will be obvious to those skilled in the art that various changes may be made in my device without departing from the spirit of my invention, and I, therefore, do not limit myself to what is shown in the drawings and described in the specification, but only as set forth in the appended claims.

Having thus fully described my said invention, what I claim as new and desire to secure by Letters Patent, is:

1. A wheel comprising a hub, a plurality of spokes, radiating from said hub and having their outer ends bent at right angles to their bodies, and a pivotally mounted shoe supported on the right angular portion of each of said spokes, substantially as set forth.

2. A wheel comprising a hub, a plurality of spokes radiating from said hub, the outer ends of each of said spokes being disposed at right angles to its body, the right angular portions of alternate spokes extending in opposite directions, and feet pivotally supported in equilibrium on said right angular portions, substantially as set forth.

In witness whereof, I have hereunto set my hand at Toronto, Ontario, Canada, this 10th day of January, A. D. nineteen hundred and twenty-seven.

GEORGE H. REID.